(12) United States Patent
Lebeau et al.

(10) Patent No.: US 11,641,807 B2
(45) Date of Patent: May 9, 2023

(54) ROUND BALER

(71) Applicant: DEERE & COMPANY, Moline, IL (US)

(72) Inventors: Jonathan Lebeau, Dijon (FR); Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 448 days.

(21) Appl. No.: 16/856,238

(22) Filed: Apr. 23, 2020

(65) Prior Publication Data

US 2020/0404853 A1    Dec. 31, 2020

(30) Foreign Application Priority Data

Jun. 27, 2019 (DE) .......................... 102019209345.0

(51) Int. Cl.
*A01F 15/08* (2006.01)
*A01F 15/18* (2006.01)

(52) U.S. Cl.
CPC ........ *A01F 15/0883* (2013.01); *A01F 15/085* (2013.01); *A01F 15/18* (2013.01); *A01F 2015/186* (2013.01)

(58) Field of Classification Search
CPC .... A01F 15/0883; A01F 15/085; A01F 15/18; A01F 2015/186; A01F 15/0875
See application file for complete search history.

(56) References Cited

U.S. PATENT DOCUMENTS

2005/0247215 A1* 11/2005 Biziorek ................. A01F 15/07
100/88

FOREIGN PATENT DOCUMENTS

| EP | 1266563 | A1 * | 12/2002 | ........... A01F 15/071 |
|----|---------|------|---------|------------------------|
| EP | 1266563 | A1   | 12/2002 |                        |
| EP | 1508268 | A1 * | 2/2005  | ......... A01F 15/0883 |
| EP | 1508268 | A1   | 2/2005  |                        |
| EP | 1889534 | A1   | 2/2008  |                        |
| EP | 3162187 | A1 * | 5/2017  | ............. A01F 15/07 |
| EP | 3162187 | A1   | 5/2017  |                        |
| EP | 3162188 | A1   | 5/2017  |                        |
| EP | 3165079 | A1   | 5/2017  |                        |

OTHER PUBLICATIONS

English translate (EP1508268A1), retrieved date Aug. 1, 2022.*
English translate (EP3162187A1), retrieved date Aug. 1, 2022.*

* cited by examiner

*Primary Examiner* — Shelley M Self
*Assistant Examiner* — Mohammed S. Alawadi (57) ABSTRACT

A round baler includes a housing which has a housing part and an ejection flap which is pivotably mounted on this housing part about a bearing axis, and drivable pressing means which are allocated to the housing part and the ejection flap and which define a pressing chamber on the peripheral side, wherein the ejection flap is adjustable by means of a first adjusting apparatus such that when the ejection flap is opened an ejection opening is able to be formed between the housing part and the ejection flap and a dimension of the ejection flap is adjustable. The housing part comprises a retaining roller. The retaining roller is arranged so as to be adjustable between a resting position and a working position in which the retaining roller adopts a position disposed within the ejection opening.

9 Claims, 5 Drawing Sheets

ROUND BALER

CROSS-REFERENCE TO RELATED APPLICATIONS

This application claims priority to and the benefit of German Patent Application No. 102019209345.0, filed on Jun. 27, 2019, the disclosure of which is hereby incorporated by reference.

TECHNICAL FIELD

The disclosure generally relates to a round baler.

BACKGROUND

Round balers are known. In round balers, agricultural harvested crops, for example straw, grass or cereals, are shaped to form a round bale and wrapped with a wrapping material, for example netting, film or binder twine. Such round balers have a pick-up and supply apparatus for the harvested crops to be pressed, the harvested crops being introduced thereby into a supply opening of a pressing chamber. The round baler includes a housing, wherein the housing may be configured, in particular, in two parts. The housing has a housing part and an ejection flap which is pivotably mounted on this housing part about a bearing axis. In particular, a bearing is located on the rear upper corner region of the housing part, the ejection flap being able to be pivotably mounted thereon.

The pressing chamber comprises one or more pressing means which are allocated to or on the housing part and the ejection flap and define the pressing chamber on the peripheral side. Thus the housing part forms a front part of the pressing chamber and the ejection flap forms a rear part of the pressing chamber. By means of the pressing means an engaging action, in particular a rotation-producing or rotation-maintaining engaging action, may be produced on a round bale located in the pressing chamber. The ejection flap is pivotable by means of a first adjusting apparatus, such that when the ejection flap is opened, an ejection opening is able to be formed between the housing part and the ejection flap. Moreover, a dimension of the ejection opening is adjustable, in particular settable and/or alterable, by means of the first adjusting apparatus.

EP 3 162 188 A1 discloses a round baler having an ejection flap which has a freely rotatably mounted support roller which is mounted upstream of the pressing means. EP 3 162 187 A1 discloses a round baler in which the pressing means of the ejection flap defining an ejection opening is uncouplable from the drive via a shifting clutch. Both the freely rotatably mounted support roller and the uncoupled and thus freely rotatable pressing means are provided in order to retain and/or to support and/or to brake the round bale when ejected by the ejection flap and in order to prevent damage to the wrapping material.

With previously known round balers, the round bale may be retained and/or braked by the ejection flap when unloaded, whereby the round bale is, for example, pushed against the housing part. As a result, the wrapping material of a round bale wrapped with a wrapping material may be damaged by the housing part, in particular by the defining pressing means. Moreover, the known round balers are too complicated in terms of construction, such that components of the ejection flap, for example the bearing of the ejection flap or the support roller, are subjected to high stresses due to the forces acting thereon.

Proceeding from this prior art, therefore, it is an object of the present disclosure to propose a round baler and a method for operating a round baler which substantially avoid the drawbacks known from the prior art, in particular to propose a round baler and a method for operating a round baler which are designed in a simple manner in terms of construction and/or production technology and/or which avoid damage to the round bale and/or wrapping material on the round bale when unloaded.

SUMMARY

According to the disclosure, a round baler having a housing is proposed. The housing has a housing part and an ejection flap which is pivotably mounted on this housing part about a bearing axis, in particular an upper axis of articulation. Pressing means, in particular drivable pressing means, are attached to and supported by the housing part and the ejection flap. The pressing means define a pressing chamber on the peripheral side of the round bale. The ejection flap is adjustable, in particular settable and/or pivotable, by means of a first adjusting apparatus, such that when the ejection flap is opened an ejection opening is able to be formed between the housing part and the ejection flap and a dimension of the ejection opening is adjustable, in particular settable and/or alterable. The housing part further comprises a retaining roller. The retaining roller is arranged so as to be adjustable, in particular is arranged so as to be settable and/or movable and/or displaceable and/or uncouplable, between a resting position and a working position. In the working position, the retaining roller adopts a position defining the ejection opening, preferably for the round bale, particularly preferably for the round bale wrapped with wrapping material.

The round baler may include a pressing chamber which may not be altered in size. In this case, the pressing means may be configured as a pressing roller, in particular a plurality of pressing rollers running parallel to one another for pressing the harvested crops. The rotational axes of the pressing rollers when the ejection flap is closed may be located on a circular arc and at least one of the pressing rollers may be driven. The arrangement of the pressing rollers in the bale pressing chamber may correspond to a cylindrical shape so that the pressing rollers are arranged cylindrically around the round bale and form a cylindrical peripheral surface. Alternatively, the round baler may also be configured with a pressing chamber which may be altered in size and/or as a round baler with a variable pressing chamber, wherein the pressing means may then be configured as belts, straps or chain arrangements. The unloading process may start with the opening of the ejection flap and terminate with the closing of the ejection flap, after unloading and retaining the fully pressed round bale.

The first adjusting apparatus may be configured as a lifting cylinder or a pivoting cylinder. The lifting cylinder or pivoting cylinder, for example, may be electrically, mechanically or pneumatically actuatable, in particular may be configured as a hydraulic or pneumatic lifting cylinder or pivoting cylinder. The first adjusting apparatus may also be configured as an electric motor, for example a spindle motor or actuator. A corresponding arrangement with a cable pull is also conceivable so that the actuation is of purely mechanical design.

The dimension of the ejection opening may be a diameter of the ejection opening or a distance between the pressing means of the housing part defining the ejection opening and the ejection flap. The round baler, preferably the housing, particularly preferably the housing part, may comprise a frame and/or a chassis. The housing, preferably the housing part, may be arranged on the frame and/or the chassis, in particular may be connected to the frame and/or the chassis and/or fastened thereto. In particular, the housing part may be fixed to the chassis. The round baler may comprise a wrapping apparatus for wrapping the round bale with a wrapping material. The round baler may comprise an unloading ramp.

In the resting position, the ejection flap may be closed. The retaining roller may adopt a working position defining the ejection opening when the ejection flap is opened. In the resting position, the retaining roller is not able to adopt any position defining the ejection opening. A "position defining the ejection opening" may be understood as the retaining roller protruding into the ejection opening in the working position. In the working position, therefore, the retaining roller may be mounted at least partially or even entirely downstream of the pressing means of the housing part defining the ejection opening and mounted upstream of the pressing means of the ejection flap defining the ejection opening and/or may be arranged between these two pressing means. In particular, when the ejection flap is closed the retaining roller may be arranged to be adjustable, in particular settable and/or movable and/or displaceable or uncouplable, from a resting position into a working position defining the ejection opening for the wrapped round bale when the ejection flap is opened. The retaining roller may be settable into the resting position and the working position and/or the retaining roller may be adjustable, in particular movable, between the resting position and the working position. In the working position, therefore, the retaining roller may reduce the dimension of the ejection opening. When the ejection flap is closed, the retaining roller may be displaced again from the working position into the resting position so that when the ejection flap is closed the pressing chamber is continuously defined via the pressing means. The retaining roller may be arranged directly on the ejection opening, in particular may be arranged directly on the pressing means of the housing part adjacent to the ejection opening. The retaining roller may be a pressing means, in particular a pressing roller. The retaining roller, for example, may be the pressing means, in particular a pressing roller, of the housing part defining the ejection opening. In particular, the retaining roller may be a pressing means which is directly adjacent to the ejection opening and which is arranged on the housing part. However, preferably in the working position, the retaining roller may also be mounted downstream of the pressing means, in particular the pressing means which is directly adjacent to the ejection opening and which is arranged on the housing part. In other words, the retaining roller may be arranged on the housing part such that in the resting position the pressing means of the housing part, which is directly adjacent to the ejection opening, defines the ejection opening and in the working position the retaining roller defines the ejection opening. The retaining roller may be a freely rotatably mounted roller, in particular a freely rotatably mounted pressing means. The retaining roller may be freely rotatably mounted on a retaining roller bearing. The retaining roller may be configured for retaining/supporting the round bale. The retaining roller may be arranged, preferably fastened and/or pivotably mounted, on the frame and/or on the chassis and/or on the unloading ramp and/or on the housing part. Similarly, the retaining roller may be also configured as a part of the unloading ramp.

Due to the arrangement of the retaining roller on the housing part rather than on the ejection flap, the round baler is designed in a simpler manner in terms of construction since the movement and/or setting of the retaining roller does not have to be additionally coordinated with the movement and/or setting of the ejection flap and/or the components of the ejection flap are prevented from being subjected to load. Moreover, in particular when the ejection flap is opened and/or the round bale is ejected through the ejection opening, it is not the defining pressing means, i.e. the pressing means on the end side of the housing part, which define the ejection opening but the retaining roller which is displaced from its resting position into the working position, so that this retaining roller bears against the round bale which rolls out of the pressing chamber and which, in particular, is wrapped. Moreover, the retaining roller may also be used as an unloading ramp. As a whole, the round bale may be offloaded in a simpler manner thereby and at the same time the round bale is prevented from being damaged during unloading.

In an embodiment of the disclosure, the round baler includes a second adjusting apparatus and the retaining roller is mounted in an adjustable manner, in particular in a settable and/or pivotable and/or swivelable and/or displaceable manner, by means of the second adjusting apparatus between the resting position and the working position. The second adjusting apparatus may comprise a first and/or second pivoting lever and/or a first and/or second actuator. The retaining roller may be freely rotatably mounted on the first and/or second pivot lever and/or the first and/or the second actuator. The retaining roller, in particular, may be freely rotatably mounted between the first and second pivot lever or between the first and second actuator. The retaining roller may be freely rotatably mounted by means of a retaining roller bearing, in particular freely rotatably mounted on the first and second pivot lever or the first and/or the second actuator. The first and/or second pivot lever may also be pivotably mounted about an axis, so that the retaining roller is adjustable by means of the first and/or second pivot lever between the resting position and working position. The first and/or second pivot lever, however, may also comprise in each case one or more guide elements. The first pivot lever may be guidable by means of the guide element(s) in a first guide rail and/or the second pivot lever may be guidable by means of the guide element(s) in a second guide rail. The pivoted adjustment may be carried out via a lever rod system. The first actuator may be connected to the first pivot lever and/or may be pivotable and/or the second actuator may be connected to the second pivot lever and/or may be pivotable. The first and/or second actuator may be configured as a lifting cylinder or pivoting cylinder. The lifting cylinder or pivoting cylinder may, for example, be actuatable electrically, mechanically or pneumatically, in particular may be configured as a hydraulic or pneumatic lifting cylinder or pivoting cylinder. The first and/or second actuator may also be configured as an electric motor, for example a spindle motor or actuator. A corresponding arrangement with a cable pull is also conceivable so that the actuation is purely mechanical. The retaining roller may be adjustable, in particular settable and/or displaceable and/or pivotable or uncouplable, by means of the second adjusting apparatus, such that in the working position the retaining roller adopts a position defining the ejection opening, i.e. in particular the dimension of the ejection opening is able to be reduced in the working position. The second adjusting apparatus may be arranged, preferably fastened and/or pivotably mounted, on the frame and/or on the chassis and/or on the unloading ramp and/or on the housing part. The retaining roller may be arranged, preferably fastened and/or pivotably mounted, by means of the second adjusting apparatus on the frame and/or on the chassis and/or on the unloading ramp and/or on the housing part. Advantageously, this permits a simple design of the round baler in terms of construction. Moreover, the second adjusting apparatus may also be advantageously used as an unloading ramp.

In an embodiment of the disclosure, the retaining roller is adjustable, in particular settable and/or displaceable and/or pivotable or uncouplable, between the resting position and the working position, as a function of a dimension of the ejection opening and/or the opening angle of the ejection flap. As a result, when ejected, the round bale may be advantageously prevented from coming into contact with a pressing means and, in particular, the wrapping material may be prevented from being damaged or destroyed. The round bale may also be safely unloaded.

In an embodiment of the disclosure, the retaining roller is controlled by a distance sensor detecting the dimension of the ejection opening and/or an angle sensor detecting the opening angle of the ejection flap. The advantage of this measure is that the control of the retaining roller may be achieved in a simple manner in terms of construction, as a function of a dimension of the ejection opening and/or the opening angle of the ejection flap.

In an embodiment of the disclosure, the pressing means of the ejection flap directly adjacent to the ejection opening, in particular the pressing means of the ejection flap defining the ejection opening, is uncouplable from a drive arrangement of the round baler, so that the pressing means of the ejection flap adjacent to the ejection opening is freely rotatably mounted. The pressing means adjacent to the ejection opening may be uncouplable from the drive arrangement by means of a shifting clutch. The shifting clutch may be uncouplable as a function of a dimension of the ejection opening and/or an opening angle of the ejection flap. Advantageously, since the retaining roller and the freely rotatably mounted pressing means directly adjacent to the ejection opening define the ejection opening, damage to the round bale, in particular the round bale wrapped with wrapping material, may be excluded.

In an embodiment of the disclosure, the round baler has an inclination sensor for measuring an inclination of the round baler and/or a communication module for receiving location information of the round baler. Moreover, the first and/or second adjusting apparatus is able to be operated as a function of the inclination and/or the location information of the round baler. By means of the inclination sensor, the inclination may be measured, in particular an inclination angle of the round baler relative to the vertical direction or an alteration of an inclination angle and/or the inclination angle relative to the gravitational force of the earth. The location information of the round baler may be the actual position of the round baler on the surface of the earth or in a suitable geometric reference system. The location information may be determined, for example, by means of the global position determination system (Global Positioning System=GPS) and provided and/or received by means of the communication module. The communication module may be a GPS device and/or a WLAN device and/or a tablet and/or smartphone. The inclination and/or the location information provide information about whether the round baler, in particular the current working location of the round baler, is located in uneven and/or hilly terrain. Advantageously, therefore, the first and/or second adjusting apparatus may be adjusted, in particular set and/or altered, as a function of the inclination and/or the location information of the round baler, i.e. as a function of the current working location.

The disclosure further relates to a method for operating an agricultural round baler. The round baler has a housing, wherein the housing has a housing part and an ejection flap which is pivotably mounted on this housing part about a bearing axis. Driven pressing means, which are allocated to the housing part and the ejection flap, define a pressing chamber on the peripheral side. The ejection flap is adjusted by means of a first adjusting apparatus such that when the ejection flap is opened an ejection opening is configured between the housing part and the ejection flap and a dimension of the ejection opening is adjusted. The housing part comprises a retaining roller and the retaining roller is adjusted between a resting position and a working position in which the retaining roller adopts a position defining the ejection opening. The method according to the disclosure has the above-described advantages of the round baler according to the disclosure and may be carried out thereby. Moreover, the round baler according to the disclosure may be used when carrying out the method according to the disclosure.

The round baler according to the disclosure may also have a control apparatus which is able to be operated to control and/or regulate, preferably to adjust, particularly preferably to set and/or to alter, the round baler, in particular the first and/or second adjusting apparatus, preferably the first and/or second actuator, such that the resting position and the working position of the retaining roller is settable and/or the retaining roller is adjustable between the resting position and the working position. The control unit may also receive and/or process the signals produced by the distance sensor and/or angle sensor and/or control and/or regulate the first and/or second adjusting apparatus and/or the first and/or second actuator by means of the signals. Moreover, the round baler may be controllable and/or regulatable by the control unit. The control unit (ECU=Electronic Control Unit or ECM=Electronic Control Module) may be an electronic module and/or an embedded system. The control unit may be already provided on the round baler or on a traction vehicle by which the round baler is pulled. The control unit may also be allocated to the round baler and the traction vehicle. The control unit and the round baler, in particular the first and/or second adjusting apparatus and/or the first and/or second actuator, may be connected together by means of a cable or wire or even wirelessly, i.e. for example by means of radio.

The disclosure, as well as further advantages and advantageous developments and embodiments of the disclosure, are described in more detail hereinafter both in terms of equipment and production technology, using exemplary embodiments and with reference to the drawing. In this case, components which coincide and/or which are comparable regarding the function thereof are denoted by the same reference numerals. In the schematic drawings:

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
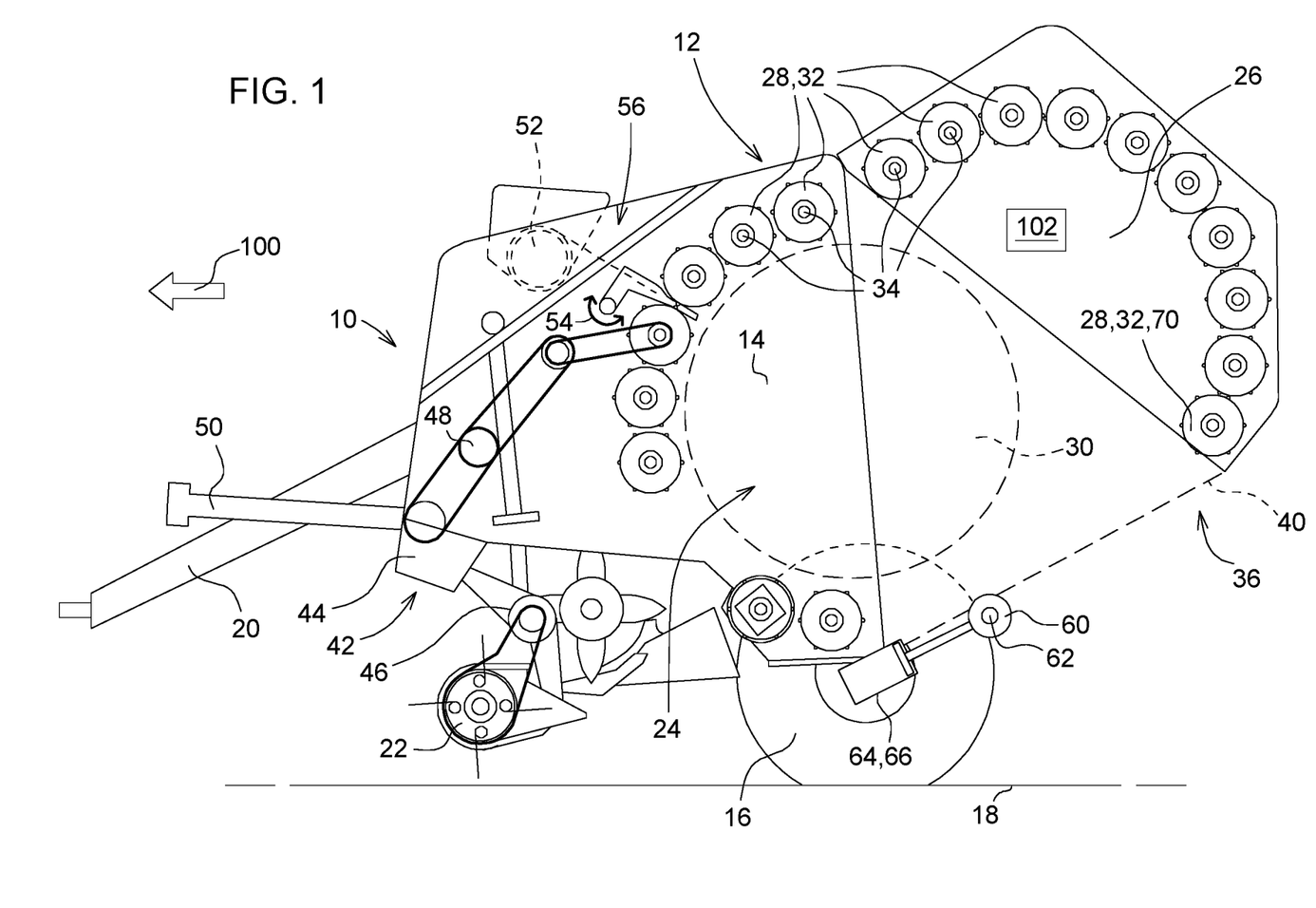
FIG. 1 shows a schematic side view of a first exemplary embodiment of a round baler according to the disclosure.

Referring to the Figures, wherein like numerals indicate like parts throughout the several views, FIG. 1 shows a schematic view of a first exemplary embodiment of a round baler 10 according to the disclosure. The round baler 10 shown schematically in FIG. 1 comprises a housing 12 with a housing part 14. The housing 12, in particular the housing part 14, is supported by means of a chassis (not shown), in this case, in particular, by wheels 16 on a substrate 18. The round baler may be attached by means of a drawbar 20 to a traction vehicle, for example a tractor or agricultural tractor, not shown.

In the known manner, a pick-up and supply apparatus 22 for harvested crops is located on the front lower side of the housing part 14 in the forward direction of travel 100. The housing 12 further comprises an ejection flap 26 which is pivotably mounted on the housing part 14 about a bearing axis, wherein in particular a bearing for the pivotably mounted ejection flap 26 is located on the rear upper corner region of the housing part 14. Drivable pressing means 28 which define a pressing chamber 24 on the peripheral side of the round bale 30 are allocated to the housing part 14 and the ejection flap 26. By means of the pressing means 28, a rotation-producing or rotation-maintaining engaging action may be produced on the round bale 30 located in the pressing chamber 24. Thus the housing part 14 forms a front part of the pressing chamber 24 and the ejection flap 26 forms a rear part of the pressing chamber 24. The round balers shown in FIGS. 1, 4 to 5 may comprise an unloading ramp (see FIG. 6, reference numeral 38).

The round baler 10, which is configured with a pressing chamber 24 which may not be altered in size, contains a plurality of pressing means 28 in the form of pressing rollers 32 running parallel to one another for pressing harvested crops (by way of example only some of the pressing rollers 32 have been provided here with the reference numeral "32"), the rotational axes thereof 34 when the ejection flap 26 is closed being placed on a circular arc and at least some of the pressing rollers being driven.

The ejection flap 26 may be actuated (opened and closed) by means of a first adjusting apparatus (not shown). In this case, the ejection flap 26 is pivotable by means of the first adjusting apparatus such that when the ejection flap 26 is opened, an ejection opening 36 is able to be formed between the housing part 14 and the ejection flap 26. The round bale 30 pressed by the round baler 10 may be deposited and/or unloaded or ejected through the ejection opening 36. The round bale 30 in this case moves in the direction of the ejection opening 36 and conventionally rolls via the unloading ramp 38 onto the substrate 18. Moreover, the ejection flap 26 is pivotable by means of the first adjusting apparatus such that a dimension 40 of the ejection opening, preferably a length of the ejection opening 36 and/or a distance between the housing part 14 and the ejection flap 26, may be altered.

The round baler 10 also has a drive arrangement 42 with a transmission arrangement 44, a first drive train 46 and a second drive train 48. A drive shaft 50 is able to be connected to a power take-off shaft (not shown) of the traction vehicle or tractor and serves as a drive for the drive arrangement 42. The first drive train 46 is operatively connected via a first output (not shown) to the transmission arrangement 44 and the second drive train 48 is operatively connected via a second output (not shown) to said transmission arrangement. The first drive train 46 drives the pick-up and supply apparatus 22, wherein the second drive train 48 is provided for driving the pressing means 28 and/or the pressing rollers 32. The drive trains 46, 48 comprise all of the drive components which are arranged in the known manner in round balers for driving the pick-up and supply apparatus 22 and/or for driving the pressing means 28 and are connected on the drive side to the first output and/or the second output of the transmission arrangement 44.

Moreover, the round baler 10 may include a wrapping apparatus 56 which is provided with a netting and/or film roll 52 as wrapping material. The wrapping apparatus 56 includes a wrapping material supply 54 which guides the wrapping material from the netting and/or film roll 52 into the pressing chamber 24. Instead of a wrapping apparatus 56 a binding apparatus (not shown) with binder twine may also be used in the known manner.

During a pressing process, the first and the second drive train 46, 48 are driven in parallel via the transmission arrangement 44 and/or via the drive and the outputs, so that the pick-up and supply apparatus 22 and the pressing means 28, 32 may be kept in operation simultaneously at a constant rotational speed ratio relative to one another. After the pick-up of harvested crops and the formation of the round bale 30 by the pressing rollers 32 is completed, the travel over the substrate 18 is interrupted since the round baler 10 is filled with the round bale 30 and no further harvested crops are intended to be and/or are able to be picked up into the pressing chamber 24. At this time, the wrapping apparatus 56 which initiates a wrapping and/or binding process is also activated. At the same time, the wrapping material is wrapped around the round bale 30 by a continuous rotation of the round bale 30 located in the pressing chamber 24. After a wrapping process is completed, the pressing process transitions into the unloading process and the round bale 30 is discharged onto the substrate 18 in the meantime via the ejection opening 36 and the unloading ramp 38 by opening the ejection flap 26.

The housing part 14 of the round baler 10 according to the disclosure includes a retaining roller 60. The retaining roller 60 is adjustably arranged between a resting position (see FIG. 2) and a working position (see for example FIGS. 1 and 3). In the working position, the retaining roller 60 adopts a position defining or disposed within the ejection opening 36, preferably for the round bale 30 wrapped with wrapping material. Due to the design of the round baler according to the disclosure, the round baler is designed in a simpler manner in terms of construction and damage to the round bale, in particular the round bale wrapped with wrapping material, may be avoided during unloading. Due to the freely rotatable mounting, the retaining roller 60 may be rotated by, and together with, the round bale 30 substantially without slippage, whereby additional tensile stresses are avoided, for example, on the round bale 30 wrapped with wrapping material.

FIG. 1 shows a round baler in which the retaining roller 60 is a freely rotatably mounted roller, which is freely rotatably mounted on a retaining roller bearing 62. The round baler 10 comprises a second adjusting apparatus 64, the retaining roller 60 being adjustable thereby between the resting position and the working position. The retaining roller 60 is freely rotatably mounted on the second adjusting apparatus 64 by means of the retaining roller bearing 62. The second adjusting apparatus 64 comprises a first actuator 66 which is configured as a lifting cylinder. The lifting cylinder may be actuatable, for example, electrically, mechanically or pneumatically. The retaining roller 60 may be adjustable between the resting position and the working position as a function of the dimension 40 of the ejection opening 36 and/or the opening angle of the ejection flap 26. To this end, the retaining roller 60 may be controlled by a position sensor 102. The position sensor 102 is attached to one of the housing part 14 and/or the ejection flap 26, and is operable to detect the dimension 40. In one implementation, the position sensor 102 is a distance sensor operable to detect the dimension 40 or distance of the ejection opening 36 between the ejection flap 26 and the housing part 14. In another implementation, the position sensor 102 includes an angle sensor operable to detect an opening angle between the ejection flap 26 and the housing part 14. Additionally, the pressing means 28, 32, 70 of the ejection flap 26 defining the ejection opening 36 may be uncouplable from the drive arrangement 42, for example by means of a shifting clutch (not shown) so that the pressing means 28, 32, 70 defining the ejection opening 36 and/or the pressing means 28, 32, 70 directly adjacent to the ejection opening are freely rotatably mounted.

Figure 2:
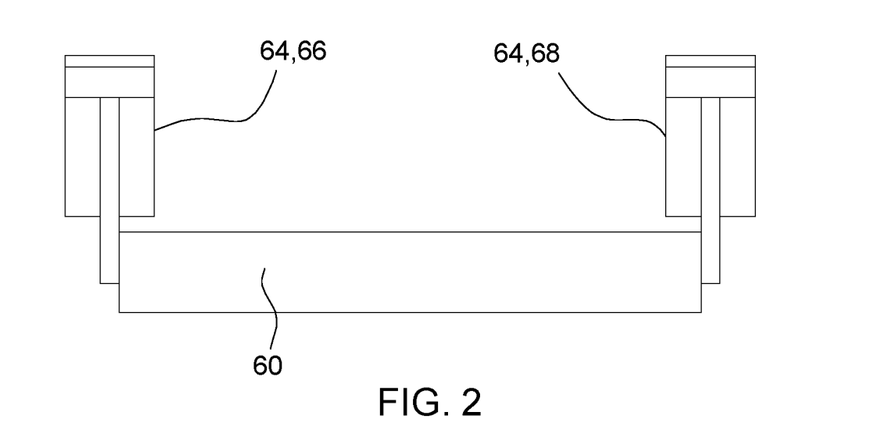
FIG. 2 shows a schematic plan view of a retaining roller with a second adjusting apparatus in a resting position.
Figure 3:
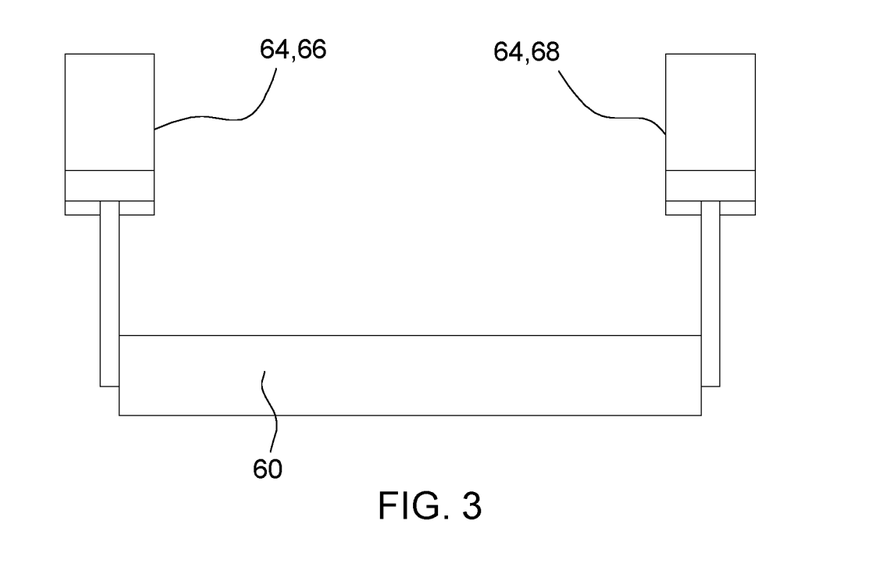
FIG. 3 shows a schematic plan view of the retaining roller with the second adjusting apparatus in a working position.

FIGS. 2 and 3 show a schematic plan view of the retaining roller 60 and the second adjusting apparatus 64 in the resting position (see FIG. 2) and the working position (see FIG. 3). The retaining rollers 60 shown in FIGS. 2 and 3 and the second adjusting apparatuses 64 substantially correspond to the retaining roller 60 in FIG. 1 and the second adjusting apparatus 64 so that only the differences are elaborated hereinafter. The second adjusting apparatus 64 comprises the first actuator 66 and a second actuator 68. The second actuator 68 is also configured as a lifting cylinder which, for example, may be actuatable electrically, mechanically or pneumatically.

Figure 4:
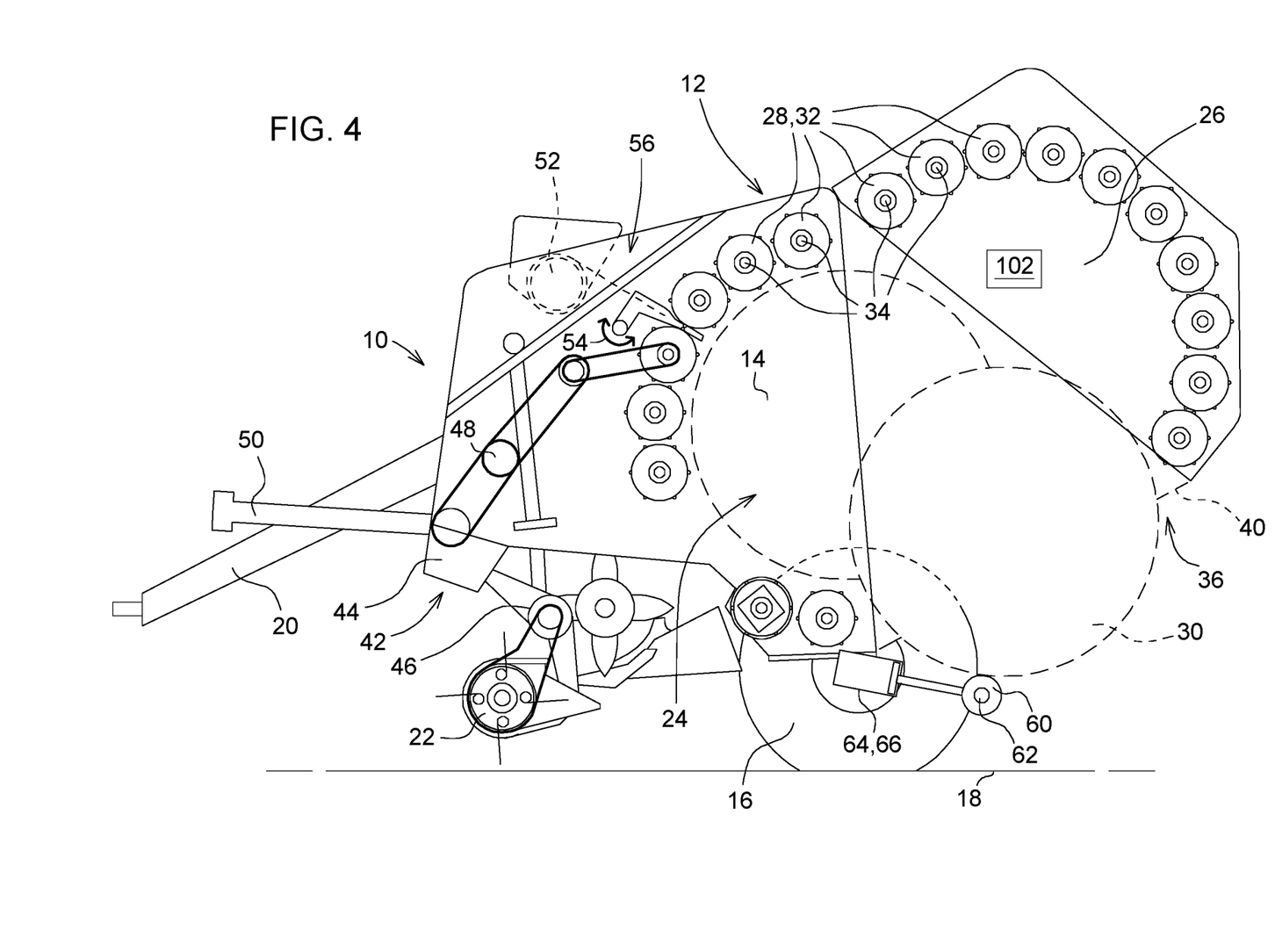
FIG. 4 shows a schematic side view of a second exemplary embodiment of the round baler according to the disclosure.

FIG. 4 shows a schematic side view of a second exemplary embodiment of the round baler 10 according to the disclosure. The round baler 10 shown in FIG. 4 substantially corresponds to the round baler 10 shown in FIG. 1, and the retaining roller 60 shown in FIG. 4 and the second adjusting apparatus 64 correspond to the retaining roller 60 and the second adjusting apparatus 64 shown in FIGS. 2 and 3, so that only the differences are elaborated hereinafter. The second adjusting apparatus 64 is pivotably mounted on the round baler 10, in this case the chassis, so that the second adjusting apparatus 64 in combination with the retaining roller 60 may retain and/or roll off the round bale 30 to be ejected. As a result, the second adjusting apparatus 64 in combination with the retaining roller 60 may be advantageously used as an unloading ramp 38.

Figure 5:
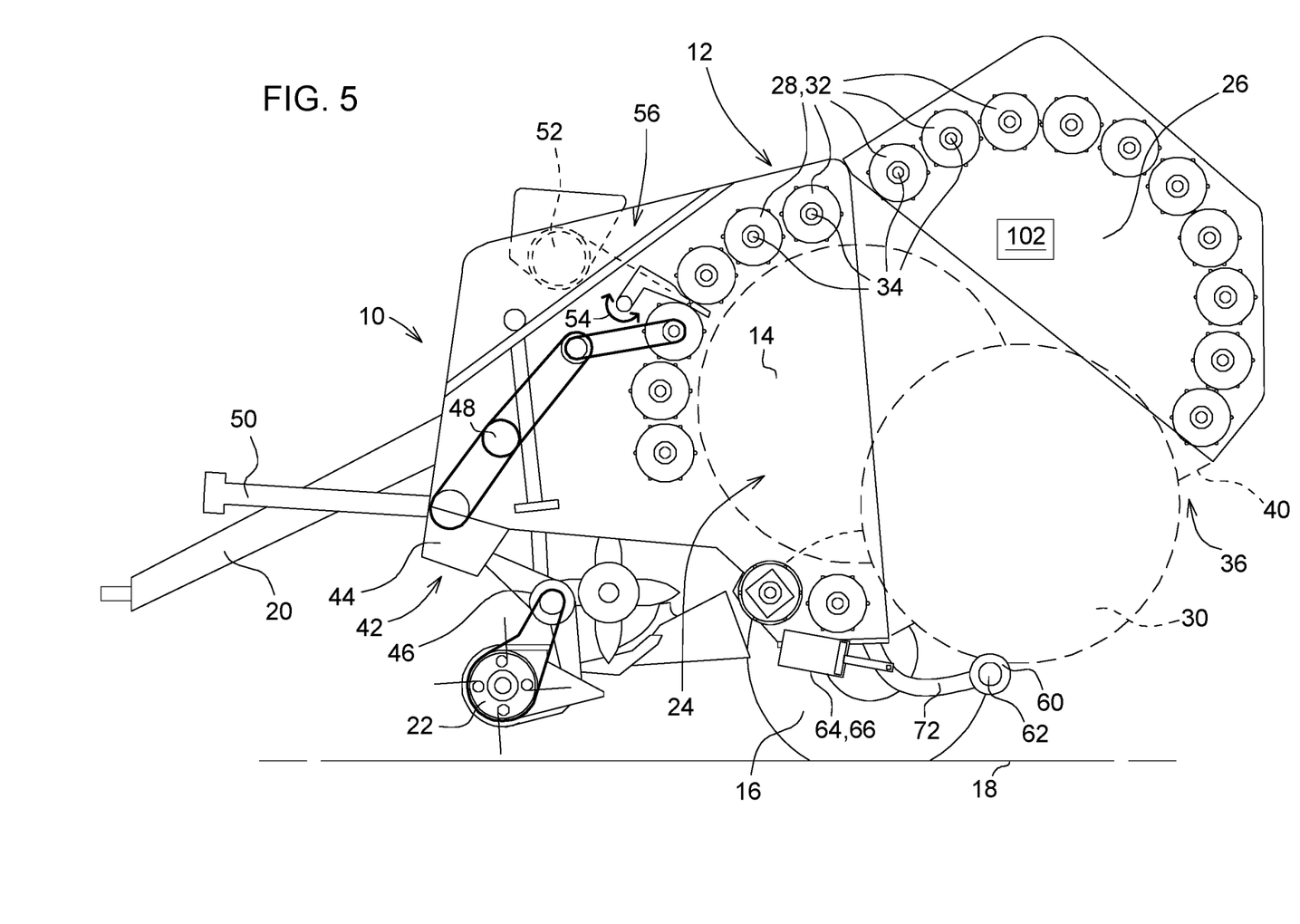
FIG. 5 shows a schematic side view of a third exemplary embodiment of the round baler according to the disclosure.

FIG. 5 shows a schematic side view of a third exemplary embodiment of the round baler 10 according to the disclosure. The round baler 10 shown in FIG. 5 substantially corresponds to the round baler 10 shown in FIGS. 1 and 4, and the retaining roller 60 shown in FIG. 5 and the second adjusting apparatus 64 correspond to the retaining roller 60 and the second adjusting apparatus 64 shown in FIGS. 2 and 3, so that only the differences are elaborated hereinafter. The retaining roller 60 is freely rotatably mounted on the first pivot lever 72. The first pivot lever 72 is pivotably mounted about an axis so that the retaining roller 60 is swivelable by means of the first pivot lever 72 between the resting position and the working position. The first actuator 66 is configured as a pivoting cylinder. The pivoting cylinder is connected to the first pivot lever 72. The first pivot lever 72 is actuatable and/or swivelable by means of the first actuator. However, a second pivot lever and/or a second actuator may also be provided. The retaining roller 60 may be freely rotatably mounted between the first and second pivot lever 72.

The second actuator 68 may be connected to the second pivot lever. The second pivot lever may be actuatable and/or swivelable by means of the second actuator 68.

Figure 6:
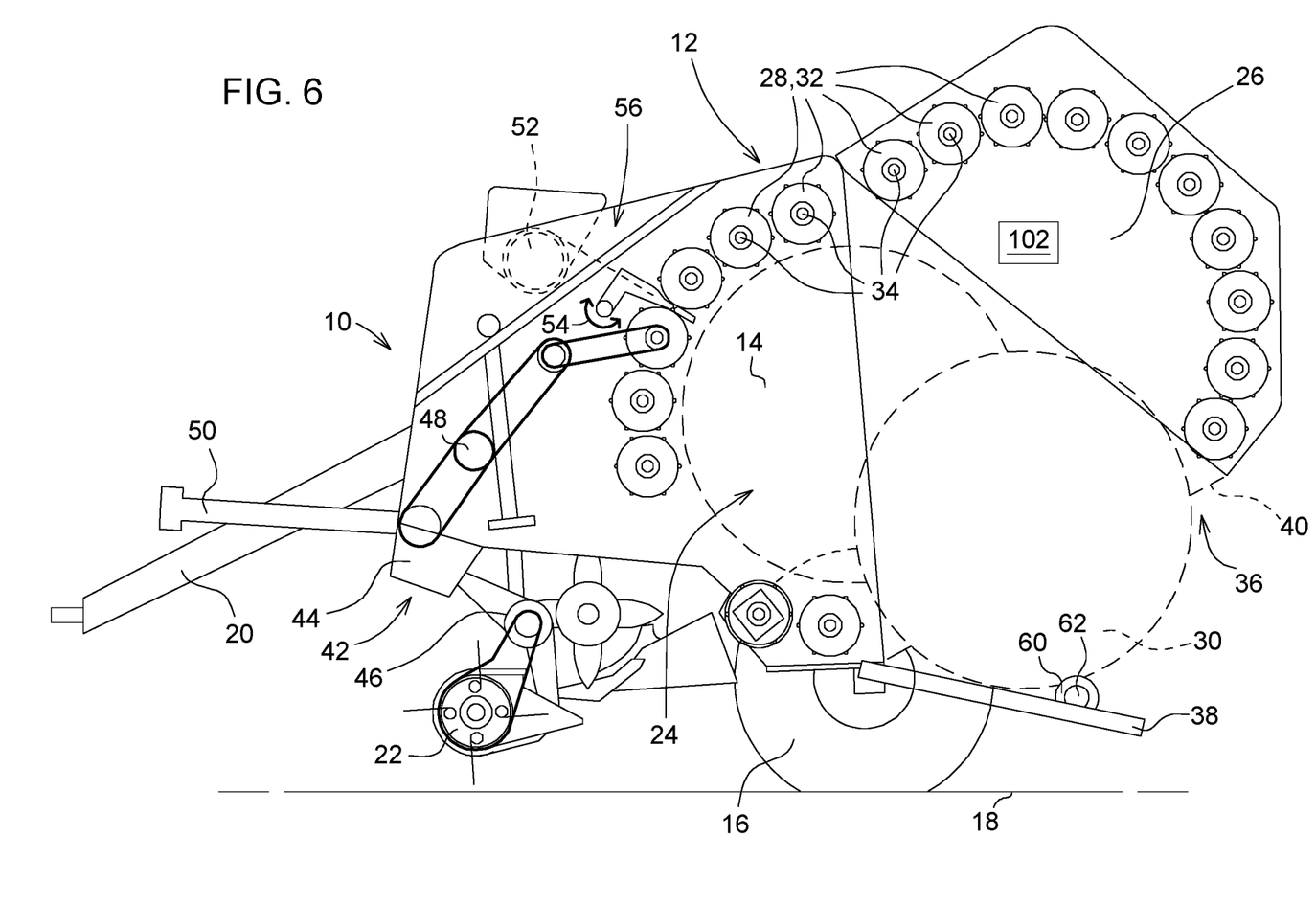
FIG. 6 shows a schematic side view of a fourth exemplary embodiment of the round baler according to the disclosure.

FIG. 6 shows a schematic side view of a fourth exemplary embodiment of the round baler 10 according to the disclosure. The round baler 10 shown in FIG. 6 substantially corresponds to the round baler 10 shown in FIGS. 1 and 4 to 5, and the retaining roller 60 shown in FIG. 6 and the second adjusting apparatus 64 correspond to the retaining roller 60 shown in FIGS. 2 and 3 and the second adjusting apparatus 64, so that only the differences are elaborated hereinafter. The retaining roller 60 is freely rotatably mounted on the unloading ramp 38. Advantageously, therefore, the unloading ramp 38 may be used as a bearing for the retaining roller 60 and a second adjusting apparatus 64 may be dispensed with.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A round baler comprising:
   a housing having a housing part and an ejection flap pivotably mounted on the hosing part for rotation about a bearing axis between a closed position and an open position;
   a drivable pressing means allocated to the housing part and the ejection flap and defining a pressing chamber for forming a round bale when the ejection flap is disposed in the closed position;
   wherein the housing part and the ejection flap define an opening therebetween when the ejection flap is disposed in the open position, with the opening having a dimension that is adjustable based on a position of the ejection flap relative to the housing part;
   wherein the housing part includes a retaining roller moveably attached to the housing part and moveable relative to the housing part between a resting position and a working position, with the retaining roller disposed within and protruding into the opening between the housing part and the ejection flap when the retaining roller is disposed in the working position to engage and support the round bale, and with the retaining roller disposed outside of the opening when the retaining roller is disposed in the resting position such that the ejection flap is moveable into and out of the closed position.

2. The round baler set forth in claim 1, further comprising an actuator interconnecting the housing part and the retaining roller, wherein the actuator is extendable and retractable to move the retaining roller between the resting position and the working position.

3. The round baler set forth in claim 1, wherein the retaining roller is moveable between the resting position and the working position based on a position of the ejection flap.

4. The round baler set forth in claim 1, further comprising a position sensor attached to one of the housing part or the ejection flap, and operable to sense a position of the ejection flap relative to the housing part, wherein the retaining roller is moveable between the resting position and the working position based on a position of the ejection flap sensed by the position sensor.

5. The round baler set forth in claim 4, wherein the position sensor is a distance sensor operable to sense a distance between the ejection flap and the housing part.

6. The round baler set forth in claim 4, wherein the position sensor is an angle sensor operable to sense an angle between the ejection flap and the housing part.

7. The round baler set forth in claim 1, wherein the drivable pressing means includes a plurality of pressing rollers, with one of the plurality of pressing rollers attached to the ejection flap immediately adjacent the opening and uncouplable from a drive arrangement to allow free rotation.

8. The round baler set forth in claim 1, further compromising a drive arrangement operable to rotate the drivable pressing means, and wherein the retaining roller is disconnected from the drive arrangement.

9. The round baler set forth in claim 1, further comprising a pivot lever interconnecting the retaining roller and the housing part, with the actuator interconnecting the housing part and the pivot lever to rotate the pivot lever relative to the housing part.

* * * * *